United States Patent
Klemt et al.

(10) Patent No.: US 10,213,961 B2
(45) Date of Patent: Feb. 26, 2019

(54) PLASTIC-METAL HYBRID COMPONENT AND METHOD FOR PRODUCING SAME

(71) Applicant: VOLKSWAGEN AKTIENGESELLSCHAFT, Wolfsburg (DE)

(72) Inventors: Christian Klemt, Lehrte (DE); René Hunger, Isenbuttel (DE); Hansjörg Kurz, Sickte (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 15/301,279

(22) PCT Filed: Mar. 20, 2015

(86) PCT No.: PCT/EP2015/055891
§ 371 (c)(1),
(2) Date: Sep. 30, 2016

(87) PCT Pub. No.: WO2015/150116
PCT Pub. Date: Oct. 8, 2015

(65) Prior Publication Data
US 2017/0021560 A1    Jan. 26, 2017

(30) Foreign Application Priority Data
Mar. 31, 2014 (DE) .................. 10 2014 104 475

(51) Int. Cl.
*B29C 65/48* (2006.01)
*C08L 83/06* (2006.01)
(Continued)

(52) U.S. Cl.
CPC .............. *B29C 65/48* (2013.01); *B29C 65/02* (2013.01); *B29C 66/026* (2013.01);
(Continued)

(58) Field of Classification Search
CPC ................................. B29C 65/48; B29C 65/02
(Continued)

(56) References Cited

U.S. PATENT DOCUMENTS

2002/0091205 A1* 7/2002 Brewer .................. C08L 77/00
525/431
2009/0324975 A1    12/2009 Du Pont
(Continued)

FOREIGN PATENT DOCUMENTS

CN    10 134 1023 A    1/2009
CN    10 322 8418 A    7/2013
(Continued)

OTHER PUBLICATIONS

Yilgor, Emel; Surface properties of polyamides modified with reactive polydimethylsiloxane oligomers and copolymers; Sep. 24, 2003; Science Direct; whole document.*
(Continued)

*Primary Examiner* — Tahseen Khan
(74) *Attorney, Agent, or Firm* — Pearl Cohen Zedek Latzer Baratz LLP (57) ABSTRACT

The invention relates to a plastic-metal hybrid component and to a corresponding method for producing a plastic-metal hybrid component. The production method has the following steps: (i) providing a fiber composite semifinished product based on polyamide, at least one part of the surface of the semifinished product being made of a polymer composition which contains the following: a) 100 wt. % of a polyamide; and b) 0.5 to 20 wt. % of one or more adhesive additives of the formula (I); (ii) providing a metal main part; (iii) optionally pretreating the surface of the metal main part in order to produce functionalities; (iv) introducing the main metal part and the fiber composite semifinished product into a pressing tool and closing the tool; and (v) bonding the fiber
(Continued)

composite semifinished product and the metal main part by means of a compression process under the effect of pressure and temperature.

9 Claims, 5 Drawing Sheets

(51) Int. Cl.
*B29C 65/00* (2006.01)
*B29C 65/02* (2006.01)
*C09J 5/06* (2006.01)
*C08L 77/02* (2006.01)
*C08L 77/06* (2006.01)

(52) U.S. Cl.
CPC .......... *B29C 66/028* (2013.01); *B29C 66/034* (2013.01); *B29C 66/1122* (2013.01); *B29C 66/524* (2013.01); *B29C 66/71* (2013.01); *B29C 66/721* (2013.01); *B29C 66/7392* (2013.01); *B29C 66/742* (2013.01); *B29C 66/74283* (2013.01); *C08L 77/02* (2013.01); *C08L 77/06* (2013.01); *C08L 83/06* (2013.01); *C09J 5/06* (2013.01); *B29C 66/301* (2013.01); *B29C 66/545* (2013.01); *B29C 66/61* (2013.01); *B29C 66/7212* (2013.01); *B29C 66/8322* (2013.01); *B29C 66/91933* (2013.01); *B29C 66/929* (2013.01); *B29C 66/949* (2013.01); *C09J 2400/163* (2013.01); *C09J 2477/00* (2013.01); *C09J 2477/006* (2013.01)

(58) Field of Classification Search
USPC ........................................................ 156/60
See application file for complete search history.

(56) References Cited

U.S. PATENT DOCUMENTS

2010/0051183 A1* 3/2010 Boke ...................... B29C 43/14
  156/228
2010/0173126 A1* 7/2010 Malek ..................... B32B 15/08
  428/138

FOREIGN PATENT DOCUMENTS

| DE | 2338317 B1 | 11/1974 |
| DE | 10 2006 027546 A1 | 12/2007 |
| DE | 10 2006 058601 A1 | 6/2008 |
| DE | 10 2007 012908 A1 | 9/2008 |
| DE | 10 2008 039869 A1 | 3/2010 |
| DE | 10 2008 058225 A1 | 7/2010 |
| EP | 2435246 B1 | 12/2012 |
| JP | S54 65734 A | 5/1979 |
| JP | 2000 129168 A | 5/2000 |
| JP | 2004 346255 A | 12/2004 |
| JP | 2005 089616 A | 4/2005 |
| WO | WO 01/76865 A1 | 10/2001 |

OTHER PUBLICATIONS

Yilgor et al. "Surface properties of polyamides modified with reactive polydimethylsiloxane oligomers and copolymers", Polymer, vol. 44, Issue 24, pp. 7271-7279.

Search Report for PCT International Patent Appl. No. PCT/EP2015/055891, dated Apr. 28, 2015.

Office Action for Chinese Patent Application No. 2018022201125170, dated Feb. 26, 2018.

* cited by examiner

PLASTIC-METAL HYBRID COMPONENT AND METHOD FOR PRODUCING SAME

CROSS-REFERENCE TO RELATED APPLICATIONS

This application is a National Phase Application of PCT International Application No. PCT/EP2015/055891, International Filing Date Mar. 20, 2015, claiming priority of German Patent Application No. 10 2014 104 475.4, filed Mar. 31, 2014, which is hereby incorporated by reference in its entirety.

FIELD OF THE INVENTION

The invention relates to a plastic-metal hybrid component as well as to an associated method for the production of such a plastic-metal hybrid component.

BACKGROUND OF THE INVENTION

In many realms of technology, fiber composite materials are now being used to improve component properties and especially in order to reduce their weight. The fiber composite material here has at least two main components, namely, a matrix and fibers that are embedded in this matrix and that serve as reinforcement. Only fiber composite materials with a polymer matrix are of interest for the purposes of the present invention. The combination of such fiber composite materials with other materials, especially metals, is a starting point for the development of new lightweight construction technologies, especially in automotive engineering. Here, the special problem arises of ensuring adequate joining of the fiber composite material to the metal. Consequently, there is a need to develop special joining methods when it comes to the production of a plastic-metal hybrid component consisting of a metal body and a fiber composite intermediate that is joined to the body and that is made of a fiber composite material with a polymer matrix.

Commonly used joining methods comprise, for example, the mechanical joining of the fiber composite intermediate to the metal components by riveting, collar joining or tack joining. Moreover, the connection between the fiber composite intermediate and the metal component can also be made by means of an adhesive method. However, classic adhesive methods have the drawback that an adhesive has to be applied and hardened in additional work steps, which makes automation more difficult. Furthermore, the material properties of the adhesive have to be such that an adequately strong adhesive force is established vis-à-vis the fiber composite material on the one hand, and to the metal component on the other hand. Moreover, the other mechanical properties of the adhesive should also be selected in such a way that the advantages of the composite can indeed come to the fore. In the meantime, special melt adhesives have been developed that allow metals to be joined to polymers. For example, European patent specification EP 2 435 246 B1 describes such a melt adhesive on the basis of copolyamide, which permits an integrally bonded connection to the metal surface via isocyanate and epoxide functionalities.

German patent application DE 10 2008 039 869 A1 describes by way of example a method for the production of lightweight components with which an integrally bonded connection of the fiber composite intermediate to the metal body is achieved by applying an adhesive. After the two elements have been combined in a pressing tool, thermal curing is carried out. Additional examples for the use of plastic-metal hybrid components in automotive engineering can be found in German patent applications DE 10 2006 027 546 A1 and DE 10 2006 058 601 A1. Here, too, an integrally bonded connection is created between metal components and the fiber composite intermediate that serves as reinforcement, and this is done by applying a suitable adhesive.

Accordingly, the prior-art integrally bonded joining methods that make use of adhesives exhibit the above-mentioned drawbacks in the method sequence, and these stand in the way of greater automation. In particular, no suitable adhesion promoters are known for the process-integrated joining by means of a pressing method in which polymer materials are joined to metals.

SUMMARY OF THE INVENTION

One or more of the described drawbacks of the state of the art can be eliminated or at least diminished by means of the method according to the invention for the production of a plastic-metal hybrid component consisting of a metal body and a fiber composite intermediate that is integrally bonded to the body. The method comprises the following steps:

(i) providing a fiber composite intermediate on the basis of polyamide in which at least part of the surface of the intermediate is made up of a polymer composition containing the following:
  a) 100 parts by weight of a polyamide;
  b) 0.5 to 20 parts by weight of one or more adhesion-promoting additives having formula (I):

wherein wherein each R, independently of each other, stands for methyl or phenyl and R' is a glycidyloxypropyl radical having formula (II)

and wherein the following applies to the indices:
  a=0 to 2
  b=0 to 2
  c=10 to 500
  d=0 to 50
  a+b=2 and
  b+d≥2;

(ii) providing a metal body;
(iii) optionally, pretreating the surface of the metal body in order to create, for example, OH functionalities;
(iv) placing the metal body and the fiber composite intermediate into a pressing tool and closing the tool; and
(v) making an integrally bonded connection between the fiber composite intermediate and the metal body by pressing them under pressure and at a certain temperature.

Thus, in step (i), a fiber composite intermediate is provided whose surface consists at least partially of a polymer material that has been modified by the addition of an adhesion-promoting additive. Therefore, the polymer composition used for this purpose contains at least two components, namely, a polyamide and an additive (or a mixture of additives) incorporated into the polyamide, which, in step (v), permits an integrally bonded connection to the surface of the metal body via its reactive epoxide group. This adhesion-promoting additive—a functionalized polysiloxane—can be incorporated into the polyamide base easily and employing conventional methods. In this application case, the additive functions as an adhesion promoter. It only marginally changes the mechanical, thermal and rheological properties of the polyamide.

If the additive concentration is too low, the adhesive effect is no longer sufficient. On the other hand, if the additive concentration is too high, this has a negative effect on the mechanical, thermal and rheological properties of the polymer (the viscosity rises, the thermal expansion coefficient increases, and self-cross-linking of the additive as well as agglomerate formation occur).

It is especially preferable for the polymer composition to contain 0.3 to 10 parts by weight, especially preferably 0.5 to 5 parts by weight, of the adhesion-promoting additive. According to a preferred variant, R stands for methyl. On the one hand, this translates into a cost advantage during the production and, on the other hand, the processing of the additive with the polyamide is simplified because of the melting and glass transition temperatures, which are lower than with phenyl-substituted additives.

Furthermore, it is preferable for the ratio of the sum of indices a+c to the sum of indices b+d to be in the range (a+b)/(b+d) of 2 to 50, especially in the range from 4 to 20, and especially preferably in the range from 5 to 15. The indicated ratio of the non-functionalized siloxane units—that is to say, the polysiloxane units containing methyl and/or phenyl radicals—to the polysiloxane units that carry the glycidyloxypropyl radical having formula (II) has proven to be particularly suitable for the production of plastic-metal hybrid components. An insufficiently small fraction of the radical having formula (II) leads to an inadequate integrally bonded connection to the surface of the metal body. In contrast, excessively high fractions make it more difficult to process the additive into the polymer composition, and the synthesis of these additives is much more complicated.

It is also preferable for the following to apply to index c: c=15 to 100, especially c=20 to 50. If b=2, the following preferably applies to index d: d=0 to 20, especially d=1 to 10. If b=0, the following preferably applies to index d: d=2 to 20, especially d=3 to 10. The above-mentioned specifications make it possible to optimize the properties of the additive in terms of the polyamide matrix as well as the subsequent further processing of the polymer composition, for example, to make a film.

The glycidyloxypropyl radicals having formula (II) can be statistically distributed in the additive having formula (I). Statistic distributions are structured in blocks with a random number of blocks, which follow each other in a random sequence or else they can form a randomized distribution, or else they can be structured alternatingly or they can form a gradient along the chain of the polymer, and they can also especially form any mixed forms in which groups of different distributions can optionally follow each other. Special configurations can lead to the fact that the statistic distributions are limited as a function of a given configuration. For all areas that are not affected by the limitation, the statistic distribution does not change.

Polyether-modified siloxanes can be produced by means of noble-metal-catalyzed hydrosilylation of allyl glycidyl ether (1-allyloxy-2,3-epoxypropane; CAS number 106-92-3) with hydrogen siloxanes having formula (III)

$$M_a M'_b D_c D'_d \tag{III}$$

wherein
$M=[R_3SiO_{1/2}]$
$M'=[HR_2SiO_{1/2}]$
$D=[R_2SiO_{2/2}]$
$D'=[HRSiO_{2/2}]$
wherein each R, independently of each other, stands for methyl or phenyl and wherein the following applies to the indices:
a=0 to 2
b=0 to 2
c=10 to 500
d=0 to 50
a+b=2 and
b+d≥2, as described, for instance, in Example 4 of European patent application EP 1 520 870 A1.

The hydrogen siloxanes having formula (III) that are used for the production of the polyether-modified siloxanes can, in turn, be produced as described in the state of the art, for example, in European patent application EP 1 439 200 A1.

The polyamide of the polymer composition according to the invention is preferably selected from the group comprising polyamide 6, polyamide 12 and polyamide 6.6. In particular, the polyamide is polyamide 6. The adhesion-promoting additive has been developed specially for use in polyamides. The additive can be processed very well with polyamides, especially polyamide 6, without separation or undesired reactions occurring between the additive and the polymer.

Aside from the polyamide and the adhesion-promoting additive, the polymer composition can also contain other additives. These additional additives serve, for example, to better process the polymer composition, to impart color or to establish other material properties. Preferably, the polymer composition cumulatively has 0 to 100 parts by weight, especially 0 to 20 parts by weight, of such additional additives.

The polymer composition is produced out of the individual components, preferably by melt-mixing in a kneading aggregate. The adhesion-promoting additive and, if applicable, additional additives can be added individually or together in the form of a mixture directly to the polyamide granules or to the polyamide melt. If applicable, the polymer composition is only made out of the individual components immediately prior to the further processing, for example, in an extruder of a system for film production. The components can likewise be added as a mixture in the form of a masterbatch.

The adhesion-promoting additives employed, which generally have a viscosity between 10 and 10,000 mPas, can be added to the polyamide either through the modality of liquid dosing during the production of the polymer composition, or else the additives are prepared as a masterbatch in solid form. The latter is preferred since the processing of liquid components in extruders is technically difficult to achieve, especially at concentrations above 10%.

Various methods are options for the production of films from the polymer composition:

In the case of casting methods, the polymer composition is liquefied in an extruder (usually a single-screw extruder) and cast through a flat film extrusion die on a rotating and water-cooled roller, as a result of which films with layer thicknesses of 25 µm to 600 µm can be made at a high production rate.

In the case of blown film methods, the extrudate is likewise liquefied in an extruder (usually a single-screw extruder) and a melt tube of the polymer composition is made employing an annular vertical die using an air stream, and the melt tube is then cooled off in the air stream. The usual film thicknesses are between 10 µm and 500 µm.

Multi-layer films can also be produced using the two above-mentioned methods. Here, at least one of the outer layers of the multi-layer film consists of the polymer composition according to the invention. Thus, for example, layers of a given thickness can be formed in the following manner:

$1^{st}$ layer=polymer composition according to the invention consisting of a polyamide and at least one adhesion-promoting additive
$2^{nd}$ layer=polyamide
$3^{rd}$ layer=polymer composition according to the invention consisting of a polyamide and at least one adhesion-promoting additive The fiber composite intermediate employed in step (i) can thus be produced out of the polyamide containing an additive using familiar methods (for example, melt, film or powder impregnation in a dual-belt pressing process, interval hot pressing). Consequently, the fiber composite intermediate is characterized in that, at least in certain areas, the surface consists of the polymer composition. Only in the places where an integrally bonded connection to the metal body is to be made in subsequent processing steps is there a need to provide the additive in the area near the surface. Thus, the additive does not have to be present in the entire volume of the fiber composite intermediate or in the entire area near the surface.

The production of the finished fiber composite intermediate is optionally followed by further process steps such as assembly, optional shaping and the like. The fiber composite intermediate is preheated for the subsequent process steps.

According to step (ii) of the method, a metal body is provided. Suitable metal materials include especially steel, for example, hot-dipped galvanized high-strength steel HX420LAD+Z100MB. Other metal materials such as, for example, stainless steels, aluminum and titanium can also be used.

Step (iii) of the method optionally involves a pretreatment of the surface of the metal body in order to create functionalities (for instance, hydroxy —OH, amino —NH$_2$, carboxyl —COOH), preferably OH-functionalities. This pretreatment can be such that the metal surface that is to be treated is pre-cleaned by means of a dry-chemical or wet-chemical process or else thermally by means of high-energy radiation, for example, lasers and plasma (evaporation of impurities) or mechanically, for example, blasting processes (sand blasting processes, pressure blasting, suction blasting). Preferably, especially if the metal body is made of galvanized sheet steel, in step (iii), an OH-functionality is created on the surface of the metal body, especially siliceously (SiOx). The generation of such a cover layer can be carried out, for example, by so-called sand blasting and coating, which is a method in which the coating of the substrate surface is carried out with a blasting process that utilizes the tribochemical effect. With this coating method, especially a modified blasting agent is used whose surface contains organofunctional silane. The impact of the coated grain creates the coating on the substrate surface. The top of the SiOx layer provides OH-functionalities for the integrally bonded connection of the adhesion-promoting additive. Moreover, the bonding surface area is enlarged by the sand blasting and coating.

After the pretreatment, the metal body is positioned in the pressing tool and heated up to a temperature in the range from 80° C. to 100° C.

Subsequently, the preheated fiber composite intermediate is put in place and the pressing tool is closed (step (iv)). Finally, heating under pressure creates the integrally bonded connection of the fiber composite intermediate to the metal body.

Step (v) of the method is preferably carried out at a temperature above the melting temperature of the thermoplastic polymer of the fiber-plastic composite. In particular, the temperature in step (v) is preferably in the range from 230° C. to 260° C. This temperature is preferably maintained for 0.5 to 10 seconds. The pressure in step (v) is preferably in the range from 10 to 200 bar, preferably 25 to 150 bar.

Immediately following step (v), for cooling purposes, a tool temperature in the range from 70° C. to 130° C. is prescribed for a period of time of 15 to 90 seconds.

Another aspect of the invention refers to a plastic-metal hybrid component consisting of a metal body and a fiber composite intermediate that was integrally bonded to the body and that was created by means of the above-mentioned method. Plastic-metal hybrid components for automotive engineering comprise especially lengthwise and crosswise support structures in the underbody as well as in the car body (underbody: for example, seat crossbeams, longitudinal chassis beams, tunnel reinforcement; car body: for example, columns and column reinforcements, pillars and pillar reinforcements as well as roof crossbeams).

Other preferred embodiments of the invention ensue from the other features cited in the subordinate claims as well as from the description below.

BRIEF DESCRIPTION OF THE DRAWINGS

The invention will be explained in greater detail below in embodiments and on the basis of the accompanying drawings. The following is shown.

DETAILED DESCRIPTION OF THE INVENTION

The polymer compositions according to the invention, the fiber composite intermediates according to the invention containing the polymer compositions according to the invention and the method according to the invention for the production of the fiber composite intermediate are described below by way of example. Whenever ranges, general formulas or compound classes are indicated below, then they are meant to include not only the appertaining ranges or groups of compounds that are explicitly cited, but also all partial ranges and partial groups of compounds that can be obtained by removing individual values (ranges) or compounds. Whenever documents are cited within the scope of the present description, then their contents are considered to belong in their entirety to the disclosure content of the present invention. Whenever percentage figures are cited below, then unless otherwise indicated, these are figures relating to percent by weight. In the case of compositions, unless otherwise indicated, the percentage figures relate to the entire composition. Whenever mean values are given below, unless otherwise indicated, these are mass averages (weight averages). If measured values are given below, these measured values, unless otherwise indicated, are determined at a pressure of 101325 Pa and at a temperature of 25° C.
General Instructions for the Production of the Polymer Composition In an extruder, adhesion-promoting additives having formula (I)

$$M_a M'_b D_c D'_d \quad (I)$$

wherein
$M=[R_3SiO_{1/2}]$
$M'=[R'R_2SiO_{1/2}]$
$D=[R_2SiO_{2/2}]$
$D'=[R'RSiO_{2/2}]$
wherein each R stands for methyl and
R' is a glycidyloxypropyl radical having formula (II)

(II)

are added to polyamides (polyamide 6 or polyamide 6.6) either directly through the modality of liquid dosing or else as a masterbatch in solid form.

In the case of liquid dosing (for example, using the system made by the Movacolor company in the Netherlands), the additives (0.1% to 20% by weight relative to the total weight of the polymer composition) were homogenously admixed in the first third of the extrusion line. As an alternative, in the case of high-viscosity additives, a pump with a heated feed line and with a heated receiver was used.

As an alternative, 50%-masterbatches of the additives were made in polyamide. Using a separate feeder, the masterbatches were dosed into the main inlet of the extrusion line where the corresponding polyamide was also fed in.

TABLE 1

Employed additives according to formula (I)

|  | a | b | c | d |
|---|---|---|---|---|
| OMS 1 | 0 | 2 | 18 | 0 |
| OMS 2 | 2 | 0 | 89 | 7 |
| OMS 3 | 2 | 0 | 43 | 5 |

TABLE 1-continued

Employed additives according to formula (I)

|  | a | b | c | d |
|---|---|---|---|---|
| OMS 4 | 2 | 0 | 73 | 25 |
| OMS 5 | 0 | 2 | 16 | 2 |

The temperature profile in the extruder corresponded to the recommendation of the manufacturer of the polyamide being used. When necessary, the polyamide was pre-dried if the moisture content was above 0.1% by weight. The polymer compositions were processed at a machine output of 3 to 10 kg per hour, depending on the filling level and on the polymer.

Testing the Polymer Compositions According to the Invention

The quality of the distribution of the additives employed in the polyamides was evaluated directly by examining the appearance of the extrudate as it emerged from the extruder head. If a homogeneous extrudate was formed without bubbles, without the extrudate exhibiting any tears, and without variation by more than 20% in the thickness of the extrudate, then it was assumed that the additive was homogenously distributed in the polyamide. In the embodiments below, this state was characterized as "OK".

TABLE 2

Polymer composition on the basis of polyamide 6 (PA6) and polyamide 6.6 (PA6.6)

| Composition | 0.1% | 0.5% | 1% | 2% | 4% | 10% | 20% |
|---|---|---|---|---|---|---|---|
| PA6/OMS 1 | OK | OK | OK | OK | OK | OK | OK |
| PA6/OMS 2 | OK | OK | OK | OK | OK | OK | OK |
| PA6/OMS 3 |  | OK |  | OK | OK | OK |  |
| PA6/OMS 4 |  | OK |  | OK | OK | OK |  |
| PA6/OMS 5 |  | OK |  | OK | OK | OK |  |

| Composition | 2% | 4% | 6% | 8% | 10% |
|---|---|---|---|---|---|
| PA6/OMS MB 1 | OK | OK | OK | OK | OK |
| PA6/OMS MB 2 | OK | OK | OK | OK | OK |
| PA6/OMS MB 3 |  | OK |  | OK |  |
| PA6/OMS MB 4 |  | OK |  | OK |  |
| PA6/OMS MB 5 |  | OK |  | OK |  |

| Composition | 0.5% | 1% | 2% | 4% | 10% |
|---|---|---|---|---|---|
| PA6.6/OMS 1 | OK | OK | OK | OK | OK |
| PA6.6/OMS 2 | OK | OK | OK | OK | OK |

MB means dosing as a masterbatch, no addition means dosing through the modality of liquid dosing; no entry means that these compositions were not produced. All of the produced polymer compositions fulfilled all of the above-mentioned quality criteria.

Film Production

Films were produced by means of the cast film process, that is to say, cast films having a layer thickness of 50 μm to 600 μm (cast film system made by the Collin company). The quality of the films was evaluated by measuring and comparing the layer thickness in various areas of the film, whereby a variation of less than 15% of the layer thickness in the application examples below was designated as being OK.

It is not necessary for the resulting film made of the polymer composition to be transparent; on the contrary, it can have an opaque appearance.

TABLE 3

Films - polymer composition and layer thickness

| Polymer composition | Film layer thickness in μm | | | | | |
|---|---|---|---|---|---|---|
| | 50 | 100 | 150 | 250 | 400 | 600 |
| PA6/0.5% OMS 1 | OK | OK | OK | OK | OK | |
| PA6/2% OMS 1 | OK | OK | OK | OK | OK | OK |
| PA6/4% OMS 1 | OK | OK | OK | OK | OK | |
| PA6/10% OMS 1 | OK | OK | OK | OK | | |
| PA6/0.5% OMS 2 | OK | OK | OK | OK | OK | OK |
| PA6/2% OMS 2 | OK | OK | OK | OK | OK | OK |
| PA6/4% OMS 2 | OK | OK | OK | OK | OK | |
| PA6/10% OMS 2 | OK | OK | OK | OK | OK | |
| PA6/2% OMS MB 2 | OK | OK | OK | OK | OK | OK |
| PA6/4% OMS MB 2 | OK | OK | OK | OK | | |

No entry means that these films were not produced. It can be seen that all of the produced films fulfilled the cited quality criteria.

Production of a Fiber Composite Intermediate on the Basis of a Film

Figure 1:
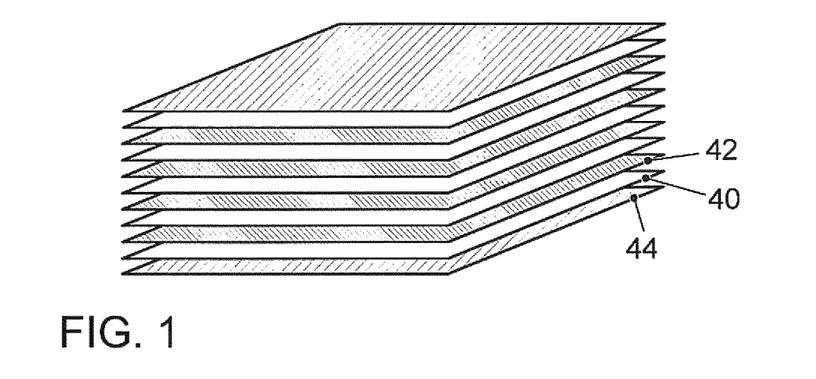
FIG. 1—a schematic view of the structure of a fiber composite intermediate produced according to the film stacking process.

The finished films were further processed into fiber composite intermediates by means of the film stacking process or by means of the hot-melt direct process. FIG. 1 schematically illustrates the structure of the fiber composite intermediate during the film stacking process and FIG. 2 during the hot-melt direct process.

Figure 2:
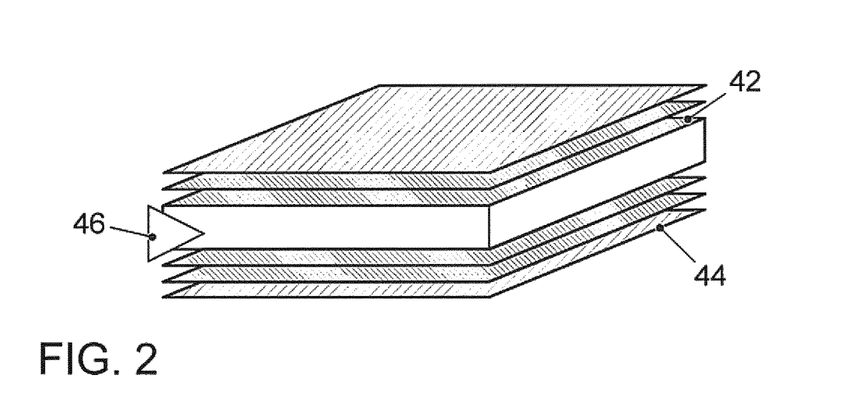
FIG. 2—a schematic view of the structure of a fiber composite intermediate produced according to the hot-melt direct process.

The configuration of the system technology for carrying out these two processes is sufficiently well-known and comprises units for feeding in material, an interval pressing unit with an impregnation and composite line as well as, downstream from this, a rolling mill and an assembly unit. The material feed comprises roller holders for the individual polyamide films and textile intermediates such as fabrics or non-wovens used in the process in question. In case of the hot-melt direct process, there is also a plasticizing unit for direct impregnation with plastic melts. The impregnation and composite line in which the fed-in films, textile intermediates and optionally melts are combined, is prescribed by the interval pressing unit. Such systems are well known; see, for instance, company publications by Neue Materialien Fürth GmbH.

FIG. 1 shows a sequence of alternating layers of the various materials by way of example, of the type that can be used for the production of a fiber composite intermediate according to the film stacking process. In this embodiment, in order to prepare the matrix material, a total of five matrix films 40 are fed into the interval pressing unit. Each matrix film 40 consists of polyamide, especially polyamide 6. Four layers of a reinforcement intermediate 42 are arranged alternatingly between the matrix films 40. The reinforcement intermediate 42 contains the fibers that serve as reinforcement. Conceivable types of fibers include, for instance, glass fibers, carbon fibers or aramid fibers. Possible reinforcement intermediates include fabrics and non-wovens. Finally, in the edge area of the layer stack shown, a modified edge film 44 is made of the polymer composition according to the invention.

Also in the case of the hot-melt direct process, layers of reinforcement intermediate 42 and modified edge film 44 are fed into the interval pressing unit in the sequence shown in FIG. 2. Moreover, a plastic melt 46 made of polyamide, especially polyamide 6, is fed in via a plasticizing unit.

The structure shown in FIGS. 1 and 2, especially the layer sequence and the number of layers of reinforcement intermediate 42 and matrix film 40, are variable and can be adapted to the applicable requirements. For purposes of the invention, it is merely important for an edge-layer modification of the fiber composite intermediate to be carried out on one side or on both sides by means of lamination with the modified edge film 44 that is made of the polymer composition according to the invention.

Production Process of a Fiber Composite Intermediate without Film Production

Another option for the production of a fiber composite intermediate whose edge layer has been modified but without a preceding film production is the dual-belt pressing process. Here, one or more layers of a dry (not impregnated) continuous fiber-reinforced fiber composite intermediate are drawn into a dual-belt press. In the intermeshing zone between the individual layers—analogously to the hot-melt direct process—the matrix material is preferably applied onto the textile by means of a flat film extrusion die.

Production of a Plastic-Metal Hybrid Component

Figure 3:
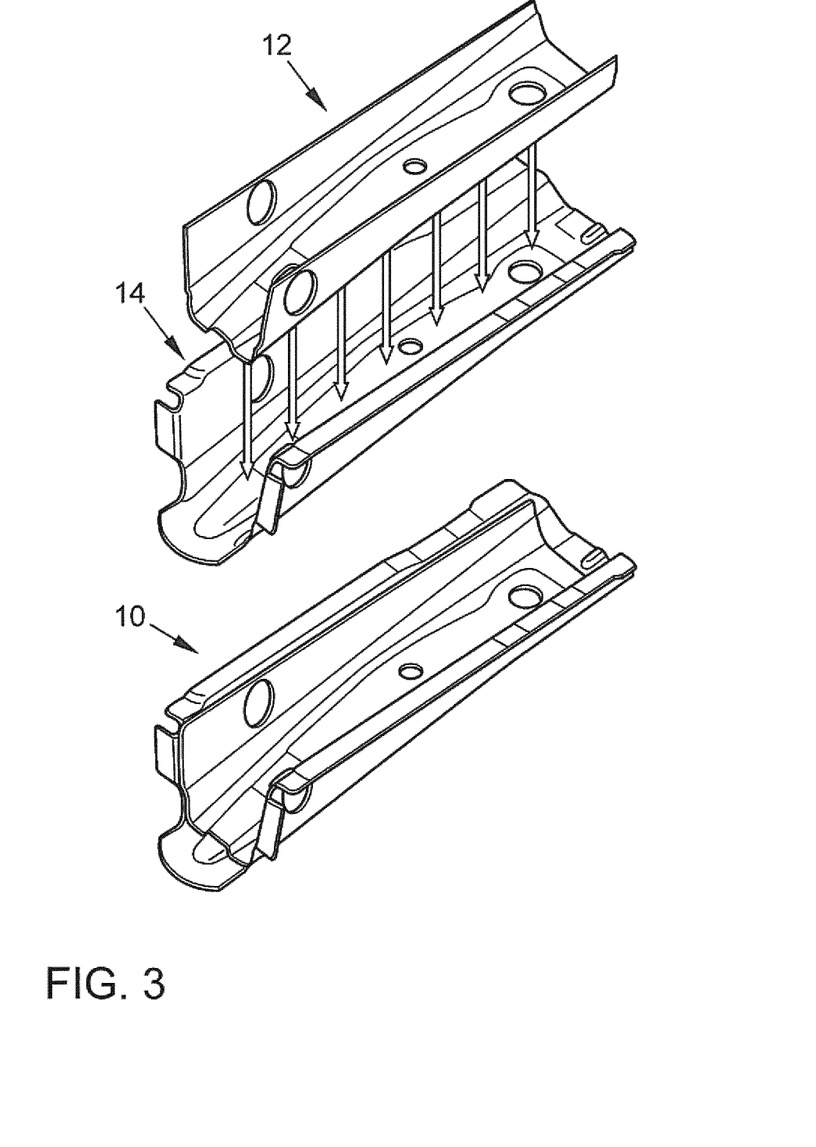
FIG. 3—a plastic-metal hybrid component according to the invention in the form of a patched seat crossbeam.

The lower section of FIG. 3 shows a plastic-metal hybrid component 10 according to the invention, here in the form of a seat crossbeam. The seat crossbeam consists of a fiber composite intermediate 12 that is integrally bonded to a metal body 14. Here, the metal body 14 consists of galvanized sheet steel that has been pretreated in a manner that will still be elaborated upon. The fiber composite intermediate 12 was produced and assembled in the above-mentioned manner.

Before the integral bonding of the two components, the metal body 14 is treated by sand blasting and coating using a modified blasting agent. The modified blasting agent has grains whose surface contains an organofunctional silane (such a modified blasting agent is commercially available, for example, from the 3M ESPE company). The blasting agent is used to clean the surface of the galvanized sheet steel, a process that is also associated with an increase in the peak-to-valley height. Due to the impact of the coated grains of the blasting agent, the organofunctional silane that is bound to the individual grains is transferred to the substrate surface owing to the so-called tribochemical effect, thereby forming an SiOx layer.

Figure 5:
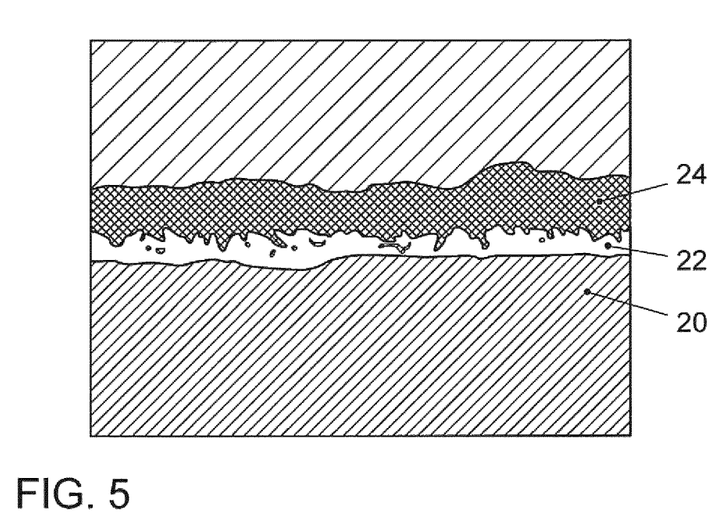
FIG. 5—a schematic microsection through a pretreated metal body.

FIG. 5 schematically shows a microsection through an area of the pretreated metal body close to the surface. The voluminous steel body 20 is covered by a thin zinc layer 22. Owing to the additive sand blasting and coating, the zinc layer 22 is followed by an SiOx layer 24.

Figure 4:
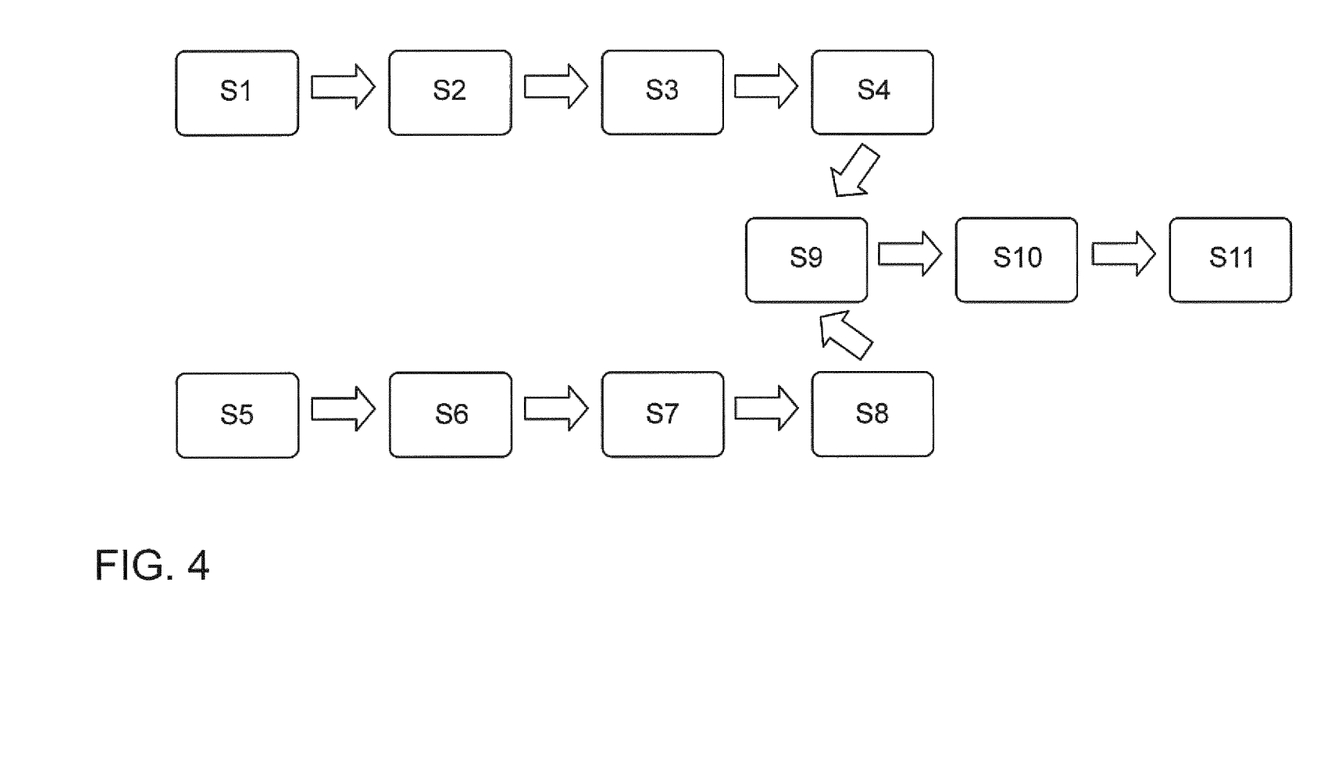
FIG. 4—a schematic flow chart of the production process for the patched seat crossbeam of FIG. 3.

FIG. 4 illustrates the sequence of the production process for a plastic-metal hybrid component 10 consisting of a metal body 14 and of a fiber composite intermediate 12 that is integrally bonded to the metal body 14.

In Step S1, first of all, the metal body 14, that is to say, for instance, the sheet metal part for the seat crossbeam is produced. After the shaped sheet metal part has been delivered (step S2), it is pretreated by means of sand blasting and coating (Step S3) as described above. Subsequently, the pretreated sheet metal part is positioned in a heated pressing tool, where it is preheated (step S4) to a temperature in the range above the melting temperature of the matrix material of the fiber composite intermediate 12. Depending on the matrix, a temperature range from 220° C. to 300° C. is preferred. In particular, a temperature in the range from 230° C. to 260° C. is prescribed for polyamide 6 as the matrix material of the fiber composite intermediate 12.

After the material for the fiber composite intermediate has been delivered (step S5), it is appropriately assembled (step S6). The fiber composite intermediate is then preheated in a step S7. The heating procedure can be carried out by means of infrared radiation. The temperature should be in a range that is from 30° C. to 70° C. above the melting temperature of the matrix material of the fiber composite intermediate 12 (preferably approximately 50° C. above it).

Then the heated fiber composite intermediate 12 is placed (step S8) onto the metal body 14 that has been preheated and positioned in the pressing tool. Subsequently, in step S9, the pressing tool is closed and the actual substance-chemical joining of the metal body 14 to the fiber composite intermediate 12 is carried out.

Subsequently, the plastic-metal hybrid component 10 is joined or pressed under pressure in the range from 10 to 200 bar, preferably 25 to 150 bar, especially preferably 30 to 70 bar, particularly 50 bar, for 0.5 to 10 seconds.

Then—optionally while maintaining the pressure—the pressing tool is cooled off in that the tool temperature is regulated (step S10) to 70° C. to 130° C. for a period of time of 15 to 90 seconds. Finally, the finished plastic-metal hybrid component 10 is removed (step S11) from the press.

Figure 6:
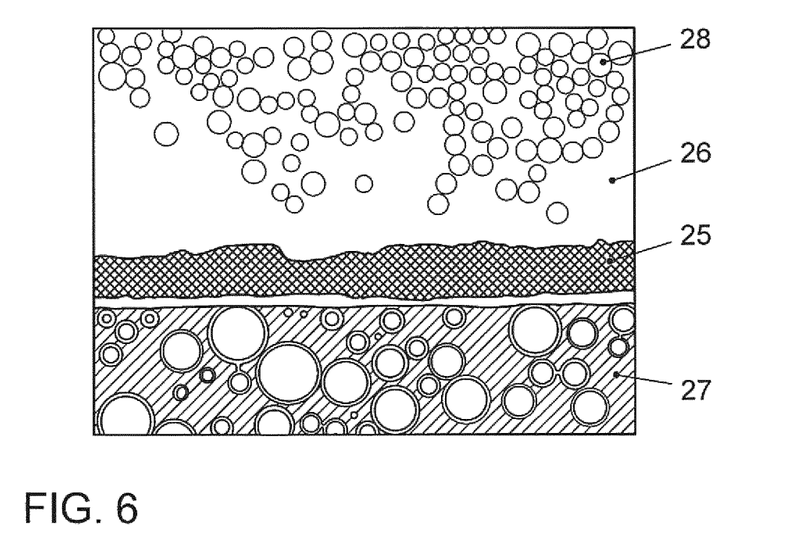
FIG. 6—a schematic microsection through a reinforcement intermediate according to the invention whose edge layer has been modified.

FIG. 6 shows a schematic section from a microsection through the modified fiber composite intermediate 12, namely, in its edge area. The modified area 25 is limited at the bottom by the embedding compound 27 used during the production of the microsection. In other words, the modified area 25 forms the edge layer or the area of the fiber composite intermediate 12 near the surface containing the above-mentioned polymer composition with the polyamide basic matrix and the adhesion-promoting additive. Above the modified area 25, there is an unmodified area 26 with a polyamide matrix material. It also contains the reinforcement fibers 28.

On the boundary surface between the modified area 25 of FIG. 6 and the SiOx layer 24 of FIG. 5, an integrally bonded connection is created by reacting the epoxide function of the additive with an OH function of the SiOx layer 24 near the surface.

Figure 7:
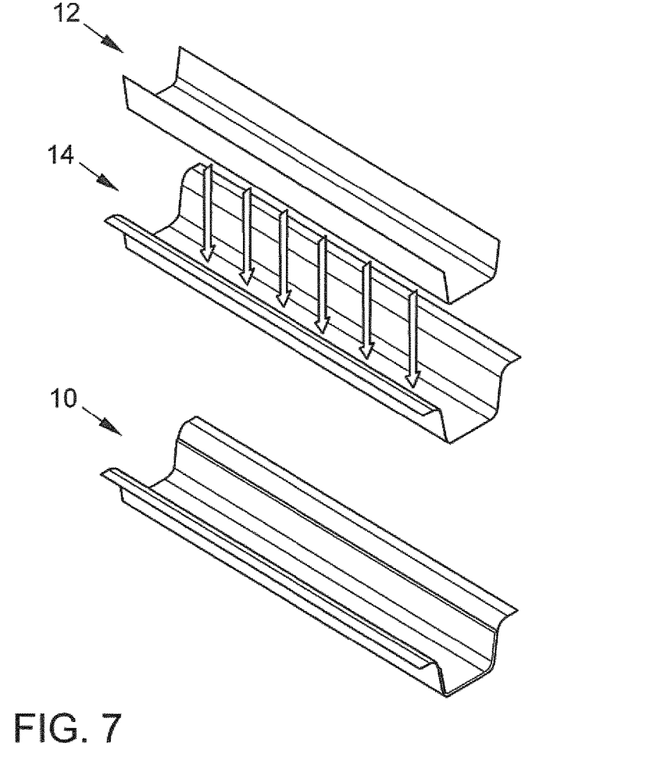
FIG. 7—another plastic-metal hybrid component according to the invention with a simplified geometry.
Figure 8A:
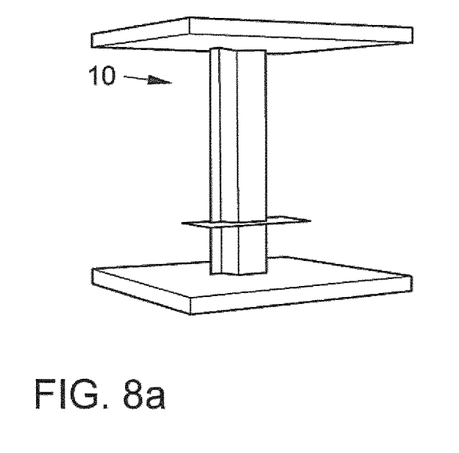
FIGS. 8a and 8b—test set-up drawings illustrating drop tower experiments with the plastic-metal hybrid component of FIG. 7.
Figure 8B:
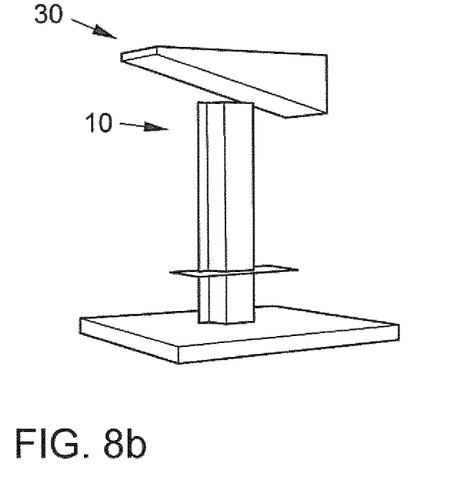

In order to test the mechanical properties, plastic-metal hybrid components 10 that had the simplified geometry were produced in the above-mentioned manner. The deformation behavior of the finished plastic-metal hybrid components 10 was determined by means of various test set-ups. In drop tower experiments, first of all, a purely axial load was examined and secondly, a multi-axial load was examined using a parallel element 30. The drop height was approximately 1.20 meter and the drop weight was 140 kg. The sheet steel of the plastic-metal hybrid component had a thickness of 1 mm and the fiber composite had a thickness of 2 mm. Sheet steels with a thickness of 1.6 mm and 1 mm were used as references. It could be showed that the deformation paths of the plastic-metal hybrid component in both test set-ups corresponded to that of the 1.6 mm-thick sheet steel component. However, the weight of the patched component was 25% less than that of the 1.6-mm sheet steel component.

LIST OF REFERENCE NUMERALS

10 plastic-metal hybrid component
12 fiber composite intermediate
14 metal body
20 steel body
22 zinc layer
24 SiOx layer
25 modified area
26 unmodified area
27 embedding compound
28 reinforcement fibers
30 parallel element
40 matrix film
42 reinforcement intermediate
44 modified edge film
46 melt

The invention claimed is:

1. A method for the production of a plastic-metal hybrid component consisting of a metal body and a fiber composite intermediate that is integrally bonded to the body, whereby the method comprises the following steps:
   (i) providing a fiber composite intermediate on the basis of polyamide in which at least part of the surface of the intermediate is made up of a polymer composition containing the following:
      a) 100 parts by weight of a polyamide;
      b) 0.5 to 20 parts by weight of one or more adhesion-promoting additives having formula (I):

$$M_a M'_b D_c D'_d \qquad (I)$$

wherein
   $M=[R_3SiO_{1/2}]$
   $M'=[R'R_2SiO_{1/2}]$
   $D=[R_2SiO_{2/2}]$
   $D'=[R'RSiO_{2/2}]$
   wherein each R, independently of each other, stands for methyl or phenyl and R' is a glycidyloxypropyl radical having formula (II)

(II)

and wherein the following applies to the indices:
   a=0 to 2
   b=0 to 2
   c=10 to 500
   d=0 to 50
   a+b=2 and
   b+d≥2;
   (ii) providing a metal body;
   (iii) optionally, pretreating the surface of the metal body in order to create, for example, OH functionalities;
   (iv) placing the metal body and the fiber composite intermediate into a pressing tool and closing the tool; and
   (v) making an integrally bonded connection between the fiber composite intermediate and the metal body by pressing them under pressure and at a certain temperature.

2. The method according to claim 1, wherein the metal body produced in step (ii) is made of galvanized sheet steel.

3. The method according to claim 1, wherein, in step (iii), an OH-functionality is created on the surface of the metal body.

4. The method according to claim 1, wherein step (v) is carried out under a pressure in the range from 10 to 200 bar, especially 25 to 150 bar.

5. The method according to claim 1, wherein, immediately following step (v), a tool temperature in the range from 70° C. to 130° C. is prescribed for a period of time of 15 to 90 seconds.

6. A plastic-metal hybrid component consisting of a metal body and a fiber composite intermediate that is integrally bonded to the body, produced by means of the method according to claim 1.

7. The method according to claim 1, wherein step (v) is carried out at a temperature above the melting temperature of the thermoplastic polymer of the fiber-plastic composite.

8. The method according to claim 7, wherein the temperature in step (v) is in the range from 220° C. to 300° C.

9. The method according to claim 7, wherein the temperature is maintained for 0.5 to 10 seconds.

* * * * *